United States Patent
Jenkins et al.

(10) Patent No.: US 11,443,284 B2
(45) Date of Patent: Sep. 13, 2022

(54) SYSTEM AND METHOD FOR SYNCHRONIZING NOTARY MEETING INTERACTIONS BETWEEN MULTIPLE SOFTWARE CLIENTS

(71) Applicant: Notarize, Inc., Boston, MA (US)

(72) Inventors: Alexander James Jenkins, Wellesley, MA (US); Patrick A. Kinsel, Boston, MA (US); Adam Pase, Washington, DC (US)

(73) Assignee: Notarize, Inc., Boston, MA (US)

( * ) Notice: Subject to any disclaimer, the term of this patent is extended or adjusted under 35 U.S.C. 154(b) by 0 days.

(21) Appl. No.: 15/886,125

(22) Filed: Feb. 1, 2018

(65) Prior Publication Data

US 2018/0218339 A1     Aug. 2, 2018

Related U.S. Application Data

(60) Provisional application No. 62/453,765, filed on Feb. 2, 2017.

(51) Int. Cl.
| | |
|---|---|
| G06Q 10/10 | (2012.01) |
| G06F 9/54 | (2006.01) |
| G06F 3/0482 | (2013.01) |
| G06Q 30/00 | (2012.01) |

(52) U.S. Cl.
CPC ....... G06Q 10/1095 (2013.01); G06F 3/0482 (2013.01); G06F 9/547 (2013.01); G06Q 10/101 (2013.01); G06Q 30/018 (2013.01)

(58) Field of Classification Search
CPC .................................................. G06Q 10/1095
See application file for complete search history.

(56) References Cited

U.S. PATENT DOCUMENTS

| | | | |
|---|---|---|---|
| 7,689,900 B1 * | 3/2010 | Fifield | G06F 21/645 |
| | | | 382/115 |
| 8,817,668 B2 | 8/2014 | Sekaran et al. | |
| 2003/0120930 A1 * | 6/2003 | Simpson | H04L 9/3247 |
| | | | 713/178 |
| 2003/0145209 A1 * | 7/2003 | Eagle | G06F 21/64 |
| | | | 713/179 |

(Continued)

FOREIGN PATENT DOCUMENTS

RU     2459371 C2     8/2020

OTHER PUBLICATIONS

Glen-Peter Ahlers Sr., The Impactof Technology on the Notary Process, 31 J. Marshall L. Rev. 911 (1998) (Year: 1998).*

(Continued)

*Primary Examiner* — Andre D Boyce
(74) *Attorney, Agent, or Firm* — Mark H. Whittenberger, Esq.; Holland & Knight LLP

(57) ABSTRACT

Embodiments included herein are directed towards a method for synchronizing notary meeting interactions between multiple software clients. Embodiments may include allowing a signer to join, via a graphical user interface associated with a first software client, a remote notary meeting. Embodiments may also include permitting a remote notary agent to control the remote notary meeting using a second software client. Embodiments may further include synchronizing one or more behaviors associated with the first software client and the second software client using an application programming interface (API).

17 Claims, 13 Drawing Sheets

(56) References Cited

U.S. PATENT DOCUMENTS

| | | | |
|---|---|---|---|
| 2005/0120217 A1* | 6/2005 | Fifield | G06F 21/645 713/176 |
| 2006/0080263 A1* | 4/2006 | Willis | G06F 21/33 705/76 |
| 2007/0093234 A1* | 4/2007 | Willis | G06F 21/6245 455/410 |
| 2008/0209516 A1 | 8/2008 | Nassiri | |
| 2013/0007845 A1* | 1/2013 | Chang | G06F 21/62 726/4 |
| 2015/0149324 A1 | 5/2015 | Szymanski et al. | |
| 2015/0150141 A1 | 5/2015 | Szymanski et al. | |
| 2015/0207786 A1* | 7/2015 | Pitroda | H04L 63/08 726/28 |
| 2016/0057388 A1* | 2/2016 | Rung | H04N 7/15 348/14.08 |
| 2016/0080347 A1* | 3/2016 | Rappaport | H04L 51/32 726/5 |
| 2016/0269379 A1 | 9/2016 | Livesay et al. | |
| 2017/0076411 A1* | 3/2017 | Mao | G06Q 50/18 |
| 2017/0352012 A1* | 12/2017 | Hearn | G06Q 20/065 |
| 2018/0293647 A1* | 10/2018 | Porter | G06F 17/242 |

OTHER PUBLICATIONS

Leslie Gordon Smith, The role of the notary in secure electronic commerce, Masters by Research thesis, Queensland University of Technology. (Year: 2006).*
International Search Report issued in PCT Application No. PCT/US2018/016381 dated Apr. 25, 2018.
Supplementary European Search Report issued in EP Application No. 18748117.1 dated Nov. 13, 2020; 12 pages.
Search Report dated Jun. 29, 2021 in counterpart Russian Patent Application No. 2019127325.
Office Action dated Jun. 30, 2021 in counterpart Russian Patent Application No. 2019127325.
Office Action dated Sep. 14, 2021 in counterpart Singapore Patent Application No. 10202108319Y.
Office Action dated Sep. 3, 2019 in counterpart Mexican Patent Application No. MX/2018/092114.
Notice before Examination dated Jun. 7, 2020 in counterpart Israeli Patent Application No. 268441.
Office Action dated Jul. 26, 2021 in counterpart Taiwanese Patent Application No. 107103786.
Communication Pursuant to Rules 70(2) and 70a(2) EPC issued in European Patent Appllication No. 18748117.1 dated Dec. 1, 2020.

* cited by examiner

Notarizing Document

TERMINATE ⌄ | | | | COMPLETE ✓

DOCUMENT 1 ⌄    PAGE 1 OF 18 ⌄    ADD STATE INFORMATION ⌄

| DOCUMENTS | 1014 — CUSTOMERS CAN ANNOTATE | 1015 — ACTIONS REQUIRED | 1016 — NOTARIZATION REQUIRED |
|---|---|---|---|
| 📄 Document 1 | ✗ No | 1 | ✗ No  👆 View ⟩ |
| 📄 Document 2 | ✓ Yes | 2 | ✓ Yes |

The National Flood Insurance Program (NFIP) is administered primarily under the National Flood Insurance Act of 1968 (1968 Act) and the Flood Disaster Protection Act of 1973 (FDPA).1 The 1968 Act made federally subsidized flood insurance available to owners of improved real estate or mobile homes located in special flood hazard areas (SFHA) if their community participates in the NFIP. The Comptroller of the Currency (OCC) to revise their current flood insurance regulations and brought lenders regulated by the Farm Credit Administration (FCA) under the coverage of the federal flood insurance statutes. The federal financial regulatory agencies and the FCA (collectively, the Agencies) jointly issued regulations on August 29, 1996 (61 FR 45684).[4]

The 1994 Act also made the flood insurance

SYSTEM AND METHOD FOR SYNCHRONIZING NOTARY MEETING INTERACTIONS BETWEEN MULTIPLE SOFTWARE CLIENTS

RELATED CASES

This application claims the benefit of U.S. Provisional Application No. 62/453,765 filed on Feb. 2, 2017, entitled AGENT-FACILITATED REMOTE ELECTRONIC NOTARIZATION MEETINGS, the contents of which are all incorporated by reference.

TECHNICAL FIELD

This disclosure relates to validation systems, and more particularly to validating authorship of an electronic signature session.

BACKGROUND

Electronic signatures or e-signatures have long been enforceable in contracts, and have the same legal consequences in many jurisdictions as more traditional forms of executing documents. With the widespread adoption of mobile devices, there has been a significant increase in the usage of user-centric mobile electronic signature services. Although mobile electronic signature services are becoming increasing widespread it is difficult to conclusively establish the identity of the signing party so as to protect against fraud.

SUMMARY

In one or more embodiments of the present disclosure, a computer-implemented method for synchronizing notary meeting interactions between multiple software clients is provided. The method may include allowing a signer to join, via a graphical user interface associated with a first software client, a remote notary meeting. The method may also include permitting a remote notary agent to control the remote notary meeting using a second software client. The method may further include synchronizing one or more behaviors associated with the first software client and the second software client using an application programming interface (API).

One or more of the following features may be included. In some embodiments, permitting the remote notary agent to control the remote notary meeting may include controlling a presentation of signing documents to the signer. A signer's display of a document may be synchronized with the remote notary agent's display of the document. In some embodiments, permitting a remote notary agent to control the remote notary meeting may include providing the remote notary agent with an option to assume control of a display of the document. The method may include preventing the notary agent from completing the remote notary meeting until all signers have complete all required actions. The method may include allowing the remote notary agent to terminate the remote notary meeting for all parties. The method may include allowing the remote notary agent to select a document for simultaneous viewing by both the remote notary agent and the signer. The method may further include displaying, at a graphical user interface associated with the second software client, a display indicating a number of actions required in order to complete the remote notary meeting. The method may also include displaying, at a graphical user interface associated with the second software client, a display indicating one or more representations of each document page requiring action of the signer, indicating a number of actions required. The method may also include allowing the notary agent, via the second software client graphical user interface, to complete the remote notary meeting once all signer actions have been completed. The method may further include allowing the notary agent, via the second software client graphical user interface, to generate a notarial certificate upon a current signing document, making it instantly visible to the signer at the first software client. The method may further include allowing the notary agent to issue control of one or more document signing tools to a specific signer of a plurality of signers.

In another embodiment of the present disclosure, a non-transitory computer readable medium is provided. Some operations may include allowing a signer to join, via a graphical user interface associated with a first software client, a remote notary meeting. Operations may also include permitting a remote notary agent to control the remote notary meeting using a second software client. Operations may further include synchronizing one or more behaviors associated with the first software client and the second software client using an application programming interface (API).

One or more of the following features may be included. In some embodiments, permitting the remote notary agent to control the remote notary meeting may include controlling a presentation of signing documents to the signer. A signer's display of a document may be synchronized with the remote notary agent's display of the document. In some embodiments, permitting a remote notary agent to control the remote notary meeting may include providing the remote notary agent with an option to assume control of a display of the document. Operations may include preventing the notary agent from completing the remote notary meeting until all signers have complete all required actions. Operations may include allowing the remote notary agent to terminate the remote notary meeting for all parties. Operations may include allowing the remote notary agent to select a document for simultaneous viewing by both the remote notary agent and the signer. Operations may further include displaying, at a graphical user interface associated with the second software client, a display indicating a number of actions required in order to complete the remote notary meeting.

The details of one or more embodiments are set forth in the accompanying drawings and the description below. Other features and advantages will become apparent from the description, the drawings, and the claims.

BRIEF DESCRIPTION OF THE DRAWINGS

Embodiments of various techniques directed to a system and a method for validating authorship of an electronic signature session, will hereafter be described with reference to the accompanying drawings. It should be understood, however, that the accompanying drawings illustrate only the various embodiments described herein, and are not meant to limit the scope of the various techniques described herein.

FIG. 8 is an illustrative diagrammatic view of a mobile software client GUI for signers, according to one or more embodiments of the present disclosure;

FIG. 9 is an illustrative diagrammatic view of a notary agent pointer control, according to one or more embodiments of the present disclosure;

FIG. 10 is an illustrative diagrammatic view of a notary agent document selection controls, according to one or more embodiments of the present disclosure;

Like reference symbols in the various drawings may indicate like elements.

DETAILED DESCRIPTION

System Overview:

Reference will now be made in detail to the embodiments of the present disclosure, examples of which are illustrated in FIGS. 1-13. The present disclosure may, however, be implemented in many different forms and should not be construed as being limited to the embodiments set forth herein. Rather, these embodiments are provided so that this disclosure will be thorough and complete, and will fully convey the concept of the disclosure to those skilled in the art.

Figure 1:
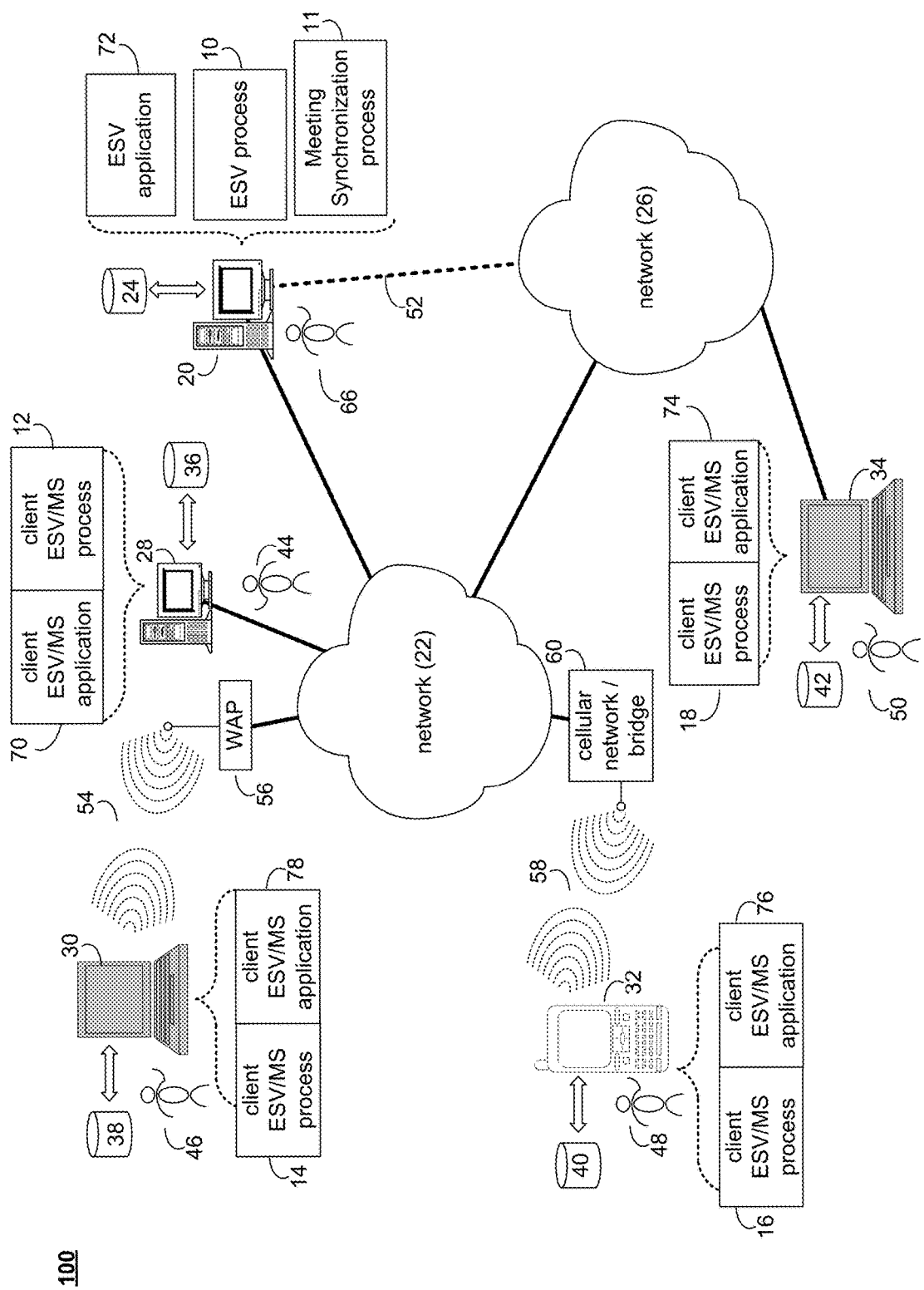
FIG. 1 is an illustrative diagrammatic view of an electronic signature validation process coupled to a distributed computing network, according to one or more embodiments of the present disclosure.
Figure 2:
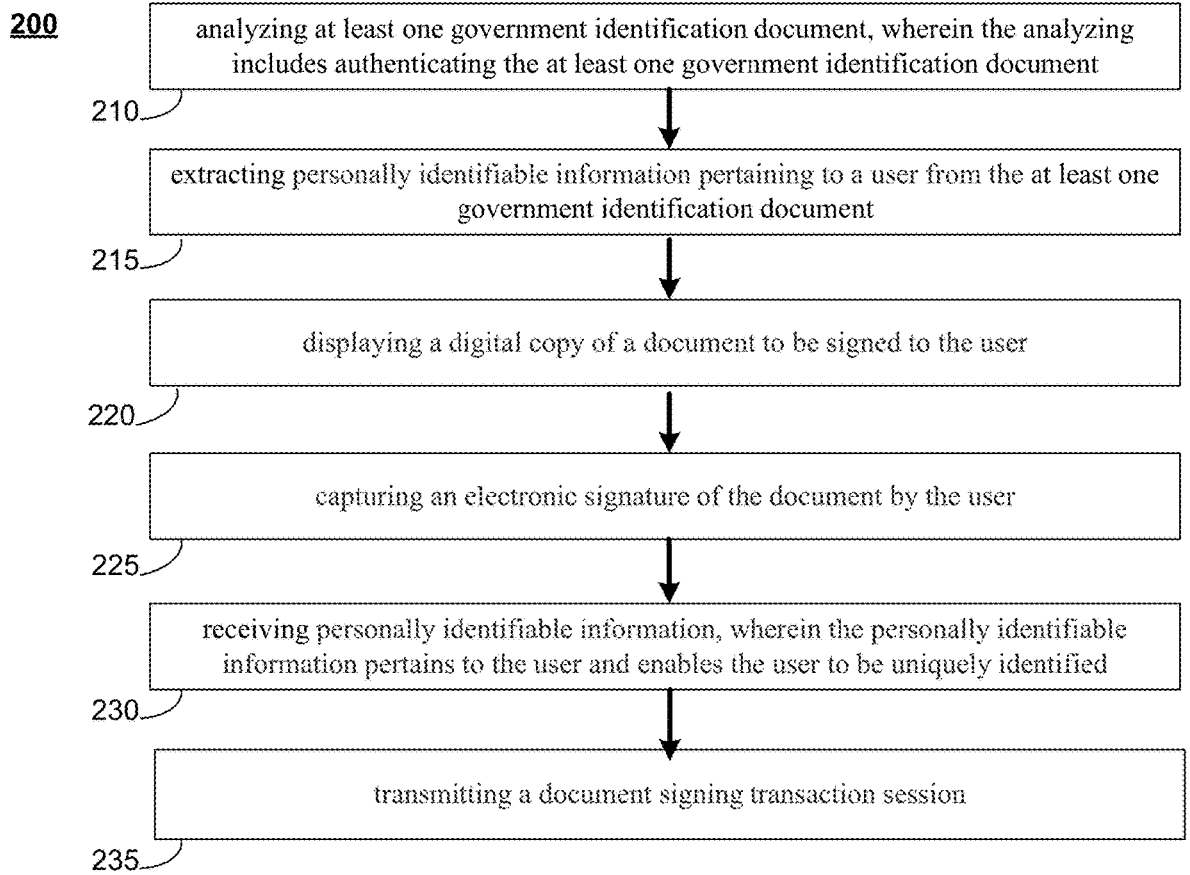
FIG. 2 is an illustrative flowchart of the electronic signature validation process of FIG. 1, according to one or more embodiments of the present disclosure.

Referring now to FIG. 1 there is shown an electronic signature validation (ESV) process 10 and a meeting synchronization process 11 that may reside on and/or be executed by a microprocessor(s) (not shown) that may be executed by one or more client electronic devices (e.g., client electronic devices 28, 30, 32 and/or 34, respectfully). Examples of client electronic devices 28, 30, 32, and 34 may include, but are not limited to, a personal computer(s) 28, a notebook computer(s) 30, a smartphone(s) 32, a laptop computer(s) 34, and an application specific device(s) (not shown). The one or more client electronic devices 28, 30, 32 and/or 34 may be connected to a network 22, wherein the network 22 may be the internet or a local area network. Further, a server ESV process 10 and/or a meeting synchronization process 11 may reside, in whole or part, on server computer 20, which may be connected to network 22.

Embodiments of client ESV/MS process 16 may be configured to leverage smartphone 32 technology (e.g. smartphone audio/visual recordings, Global Positioning System (GPS), etc.), and may include one or more downloadable applications, an application specific device, cellular connectivity, and a web based monitoring system. Accordingly client ESV/MS process 16 may validate authorship of a user's (e.g. user 48) electronic signature of a digital copy of a document 410.

Referring now to FIGS. 1 through 13, while client ESV/MS process 16 is depicted in FIG. 1, and throughout the disclosure as residing in whole or in part on a smartphone 32 this is intended to be for illustrative purposes only. The smartphone 32 may be any mobile computing device, some of which may include, but are not limited to a tablet, a phablet, smartwatch, or an application specific device, wherein the mobile computing device is capable of executing in whole or part the client ESV/MS process 16.

Referring again to FIG. 2, there is shown a flowchart for a method 200 for transmitting a document signing transaction session from a client ESV application 76 to an ESV application 72, wherein the document signing transaction session may be associated with a user 48. In some instances the document signing transaction session may include personally identifiable information, wherein the personally identifiable information may enable the user 48 to be uniquely identified. ESV process 10 may include analyzing (210) at least one government identification document, wherein the analyzing includes authenticating the at least one government identification document. Embodiments may further include extracting (215) personally identifiable information pertaining to a user from the at least one government identification document. Embodiments may also include displaying (220) a digital copy of a document to be signed to the user and capturing (225) an electronic signature of the document by the user. Embodiments may further include receiving (230) personally identifiable information, wherein the personally identifiable information pertains to the user and enables the user to be uniquely identified. Embodiments may also include transmitting (235) a document signing transaction session. Numerous other operations are also within the scope of the present disclosure, which are discussed in further detail hereinbelow.

In some embodiments, the client ESV/MS application 76 may be executed by client ESV/MS process 16, and client ESV/MS process 16 may reside on, and may be executed by client device 32, wherein client device 32 is a smartphone 32. Client ESV/MS application 76 may be a standalone client ESV/MS application 76. The ESV/MS application 72 may be executed by server ESV/MS process 10, and server ESV/MS process 10 may reside on and may be executed by server computer 20. Server computer 20 may be one or more web servers, wherein the ESV/MS application 72 may be a web base application.

It should be understood that while processes 200 and 1300 indicates a particular order of execution of operations, in some instances, certain portions of the operations may be performed in a different order, and on different systems. Further, in some other instances, additional operations or steps may be added to processes 200 and 1300. Similarly, some operations or steps may be omitted from processes 200 and 1300.

In some embodiments, ESV process 10 and/or meeting synchronization process 11 may include monitoring one or more sensor(s), wherein the one or more sensors are configured to collect personally identifiable information pertaining to the user 48. For example, the smartphone 32 may include a camera, wherein the camera may be configured to capture a real-time image 510 of the user. The real-time image 510 of the user 48 may be used to uniquely identify the user 48 and/or verify that the user is performing a required act, wherein the required act may be signing a digital copy of a document 410 with an electronic signature, executing an oath, making an affidavit etc.

In some embodiments, the personally identifiable information may include biometric data and/or location data. For example, the biometric data may include at least some of a DNA analysis, an earlobe geometry analysis, an eye patterns analysis, a facial recognition analysis, a fingerprint analysis, a hand geometry analysis, a signature analysis, and a voice waveform analysis. For example, the location data may include one more of Global Positioning System (GPS) data, Wi-Fi access point identification information, cell phone tower identification information, wherein the location data is Assisted Global Positioning System (A-GPS) data. The personally identifiable information pertaining to user 48 may enable the user 48 and his/her location to be uniquely identified, and thereby validate authorship of an electronic signature session.

In some embodiments, ESV process 10 and/or meeting synchronization process 11 may include scanning one or more forms of government identification document(s) associated with the user 48, wherein the one or more forms of government identification document(s) include personally identifiable information. For example, the client ESV/MS process 16 may utilize one or more camera(s) of the smartphone 32 to scan one or more forms of government identification document(s), wherein the one or more forms of government identification document(s) may include at least one of, Social Security Card, driver's license, government issued identification card, military identification, passport, passport card, birth certificate, Department of Defense identification card, Certificate of U.S. Citizenship, Certificate of Naturalization, Green Card, NEXUS card, SENTRI card etc. In some instances, the ESV/MS process 16 may utilize one or more camera(s) of the smartphone 32 to capture an image of the one or more forms of government identification document(s) provided by the user 48. For example, the user 48 may use their smartphone 32 to take a picture of their driving license 310, and the image may be uploaded to client ESV/MS application 76 and/or ESV/MS application 72 for processing, wherein ESV/MS application 72 is a web based ESV application.

In some embodiments, ESV process 10 and/or meeting synchronization process 11 may include authenticating the one or more forms of government identification document(s), wherein the authenticity of the one or more form(s) of government identification document(s) may be validated. In some instances, the authentication may be done by one or more supervisors 66 and/or the authentication may be done by one or more software analysis programs. The one or more software analysis programs may be part of the client ESV/MS application 16 and/or part of the ESV/MS application 72.

In some embodiments, ESV process 10 and/or meeting synchronization process 11 may include extracting personally identifiable information pertaining to the user from the one or more forms of government identification. In some instances, the extraction of personally identification information may be done by one or more software analysis programs. The one or more software analysis programs may be part of the client ESV/MS application 16 and/or part of the ESV/MS application 72. For example the user 48 may take a picture of their government identification document using their smartphone 32 camera, and the one or more software analysis programs may digitize the user's 48 photograph 320 and/or signature 330, which may be incorporated into the government identification document. In some instances, the user's 48 digitized personal identification information may be used as a reference. For example, a photograph 320 of the user 48 may be extracted from an authenticated form of government identification and used as a reference image 520 of the user 48. In another embodiment, the ESV process 10 and/or meeting synchronization process 11 may include extracting at least one of the user's date of birth 340, driving license number 390, eye color 380, hair color 360, height 370, social security number, residential address 350, sex 355, weight 350 etc., wherein the extracted information may be recorded, this information may also be used for identification purposes. In some instances, the user's extracted information may be used to autofill required fields 420 within the digital copy of the document 410.

In some embodiments, ESV process 10 and/or meeting synchronization process 11 may include displaying a digital copy of a document 410. The digital copy of the document 410 may be displayed on a screen of the smartphone 32. A user may scroll through this document 410, and may select one or more fields 420 within the document 410 that require the user's electronic signature. The user may select fields 420 within the document 410 using a pointing device, wherein the pointing device may be the user's finger and/or a stylus. To administer the signature session the smartphone's 32 display may be configured as an input field, wherein the user may draw their signature, using their finger or a stylus as if it were a handwritten signature using pen and paper.

In some embodiments, ESV process 10 and/or meeting synchronization process 11 may include capturing the user's signature, wherein the user's signature is digitized. The ESV/MS process 16 may further allow the user to place their electronic signature in the one or more fields 420 within the document 410, wherein the electronic signature may be scaled to fit the document field 420. In some instances, the electronic signature may be automatically be scaled to fit the document field 420 by the ESV/MS process 16. The user and/or ESV/MS process 16 may further verify that an electronic signature has been placed in all the required fields 420 in the document 410, whereupon the document 410 may be consider executed by the user. By executing the document 410 the user may be considered to have adopted the contents of the document 410.

In some embodiments, ESV process 10 and/or meeting synchronization process 11 may include comparing the real-time image 510 of the user with a reference image 520 of the user 48. The real-time image 510 may be used to uniquely identify the user 48 and confirm that the user 48 is performing a required task, wherein the required task is the electronic signature of a digital document 410. In some instances, the comparison may be done by one or more supervisors 66 and/or the comparison may be done by one or more software analysis programs. The one or more software analysis programs may be part of the client ESV/MS application 16 and/or part of the ESV/MS application 72.

In some embodiments, ESV process 10 and/or meeting synchronization process 11 may include facial recognition technology. For example, storage device 24 may include a database of stored images associated with each particular user of the client ESV/MS application 76, wherein the stored images may be authenticated images. In some instances, each user may be validated by sending a captured photo and/or video from their smartphone 32 over the network(s) 22 and/or 26, whereupon the photo may be compared against the images stored within the database of stored images in order to validate the user's 48 identity. Other biometric sensors and validation techniques may also be used without departing from the scope of the present disclosure. Additionally and/or alternatively, the facial recognition, biometric and location approaches described herein may be used wholly or partly with any other features of the ESV process 10 and/or meeting synchronization process 11.

In some embodiments, ESV process 10 and/or meeting synchronization process 11 may include determining a confidence score by means of software or human analysis. For example, ESV/MS process 16 may compare the real-time image 510 of the user with a reference image 520 of the user 48, for the purpose of positively identifying the user 48, wherein the reference image 520 may have been extracted from one or more forms of government identification documents described herein. In some instances, the comparison may be performed by one or more software facial recognition programs, wherein one or more software facial recognition programs assign a confidence score based upon their analysis of whether the person identified in the reference image 520 corresponds to the person depicted in the real-time image 510. Further, there may a threshold value for the confidence score, wherein the threshold value may determine whether the comparison is to be validated by a supervisor 66. In another embodiment, the verification may be performed entirely by a supervisor 66, and the supervisor 66 may assign a confidence score based on their analysis. In this instance, the ESV/MS process 16 may live stream the document signing transaction session, wherein the document signing transaction session may be streamed in part or in its entirety.

In some embodiments, ESV process 10 and/or meeting synchronization process 11 may include recording a document signing transaction session, wherein the document signing transaction session may be recorded in part or in its entirety. For example, the ESV/MS process 16 may utilize one or more camera(s) of the smartphone 32 to record a real-time image 510 of the user 48, wherein the real-time image 510 may be used to authenticate the identity of the user 48 and/or capture an image of the user 48 signing a digital copy of the document 410. The recording of the document signing transaction session may include at least some of, but not limited to, one or more forms of government identification documents, the digital document 410 to be signed, the user 48 signing the digital document 410, one or more forms of personally identifiable information as described herein etc. The recording of the document signing transaction session may further include a unique document identification number, wherein a unique document identification number is associated with each recording. In another embodiment, the recording may also record, and thereby identify in the case of a multi-party recording, any witnesses to the user 48 signing the digital document 410. The recording may also include metadata, such as the user's identifying information, who witnessed the document signing transaction session, location information, and other information relevant to the document signing transaction session. The recording may be transmitted in real-time to a ESV network 22 and/or 26, associated with the ESV/MS application 72.

In some embodiments, ESV/MS process 16 may include generating a unique identification number. The unique identification number may be associated with the document signing transaction session and may be a proprietary unique identification number. The unique identification number may be based upon, at least in part, the document signing transaction session metadata. In some instances, the unique identification number may be used to endorse the validity of the document signing transaction session. For example, the ESV/MS process 16 may generate a unique identification number based upon, at least in part, the confidence score being greater than a threshold value and/or document signing transaction session be validated by a supervisor 66. In some instances, the supervisor 66 may further record that they observed the document signing transaction session in its entirety, whereupon the unique identification number may be appended to and/or added to the document signing transaction session. In another embodiment, a certification mark and/or seal may be appended to and/or added to the document 410, wherein the certification mark may be a proprietary mark. The unique identification number may be used to retrieve the document signing transaction session at a later date.

In some embodiments, ESV process 10 and/or meeting synchronization process 11 may include storing the document signing transaction session. In some instances, ESV process 16 and/or meeting synchronization process 11 may store the document signing transaction session locally on the smartphone storage device 32. The document signing transaction session may later be retrieved and transmitted to ESV/MS application 72, wherein the document signing transaction session may be stored on network storage device 24. The stored document signing transaction session may be stored for later retrieval and/or reference, wherein the unique identification number may be used to retrieve the document signing transaction session. The information pertaining to the signing transaction session and the executed document will be stored in a manner such that they are logically associated together so that the session details may later serve as supplementary verification details for the document itself.

In some embodiments, ESV process 10 and/or meeting synchronization process 11 may include enabling a wireless transmitter to transmit a document signing transaction session, wherein the document signing transaction session includes at least one of, the digital document 410, one or more electronic signatures, one or more forms of government identification document(s) or evidence of other means of identity verification, a real-time recording of the user, a real-time recording of one or more witness, a unique document identification number, the audit trail of the identify verification method, the video recording of the signing session, a confidence number etc. The document signing transaction session may be transmitted from the smartphone 32 to ESV/MS application 72. Further, the document signing transaction session may be transmitted in response to a prompt from the monitoring network 22 and/or 26, or at the initiation of the user 48.

Figure 3:
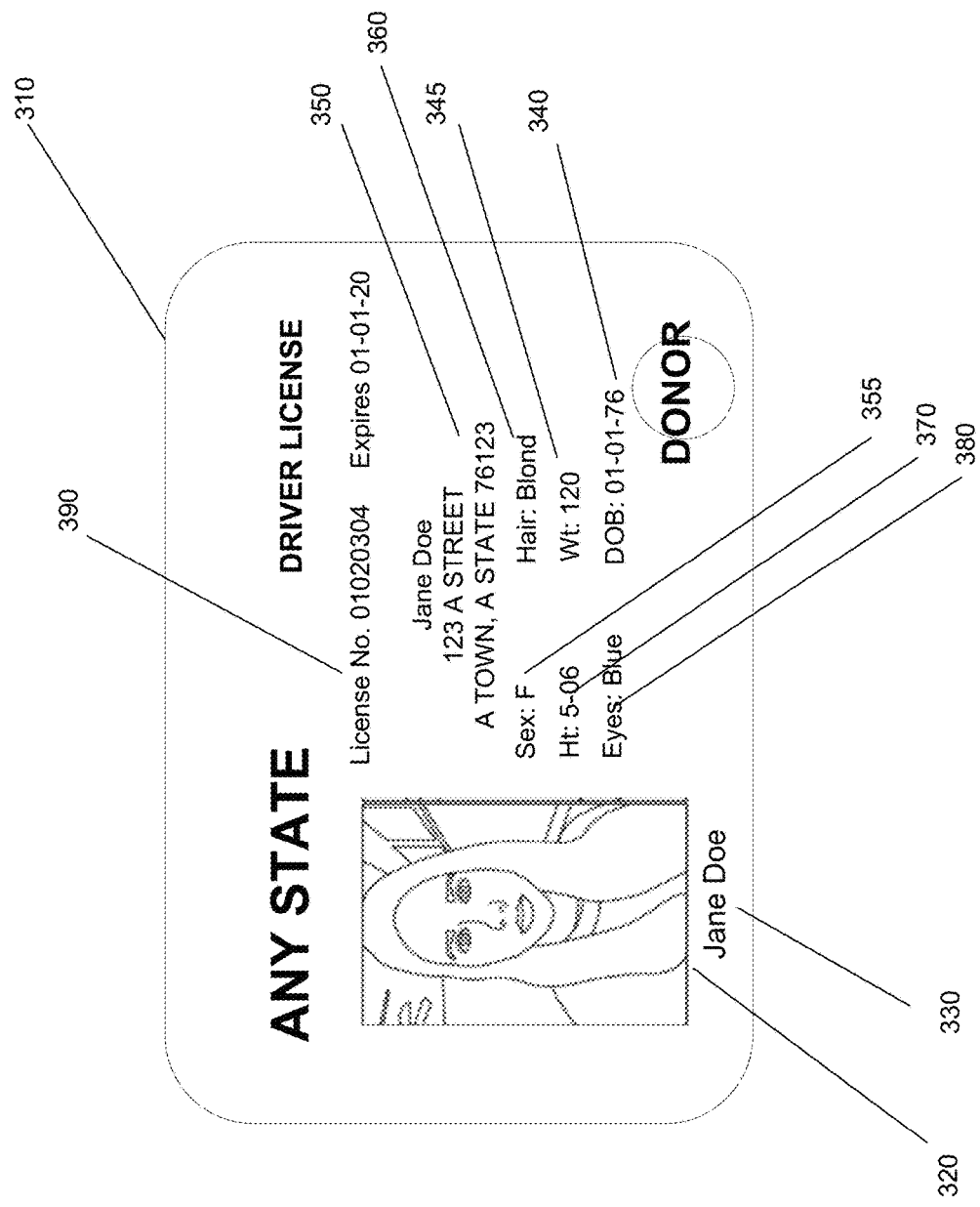
FIG. 3 is an illustrative diagrammatic view of a client electronic signature validation application scanning interface, according to one or more embodiments of the present disclosure.

Referring now to FIG. 3, there is shown a diagrammatic view of a client ESV/MS application 76 scanning interface 300 depicted on the display of the mobile smartphone 32. The scanning interface 300 may permit the user to scan one or more forms of government identification document(s) associated with the user 48. For example, the user may utilize one or more camera(s) of the smartphone 32 to capture an image of the one or more forms of government identification document(s). The one or more forms of government identification document(s) may include at least one of, Social Security Card, driver's license 310, government issued identification card, military identification, passport, passport card, birth certificate, Department of Defense identification card, Certificate of U.S. Citizenship, Certificate of Naturalization, Green Card, NEXUS card, SENTRI card etc. For example, the user 48 may use their smartphone 32 to take a picture of their driving license 310, and the picture may be uploaded to client ESV/MS application 76 and/or ESV/MS application 72. The uploaded picture may further be authenticated by one or more software analysis programs, wherein the one or more software analysis programs may be associated with client ESV/MS application 16. In some instances, personally identifiable information pertaining to the user may be extracted from the driving license 310. For example, a photograph 320 of the user 48 may be extracted from the user's driving license 310 and used as a reference image 520 for the user 48. Alternatively/additionally, a signature 330 of the user 48 may be extracted from the user's driving license 310 and used as a reference signature 330 for the user 48.

Figure 4:
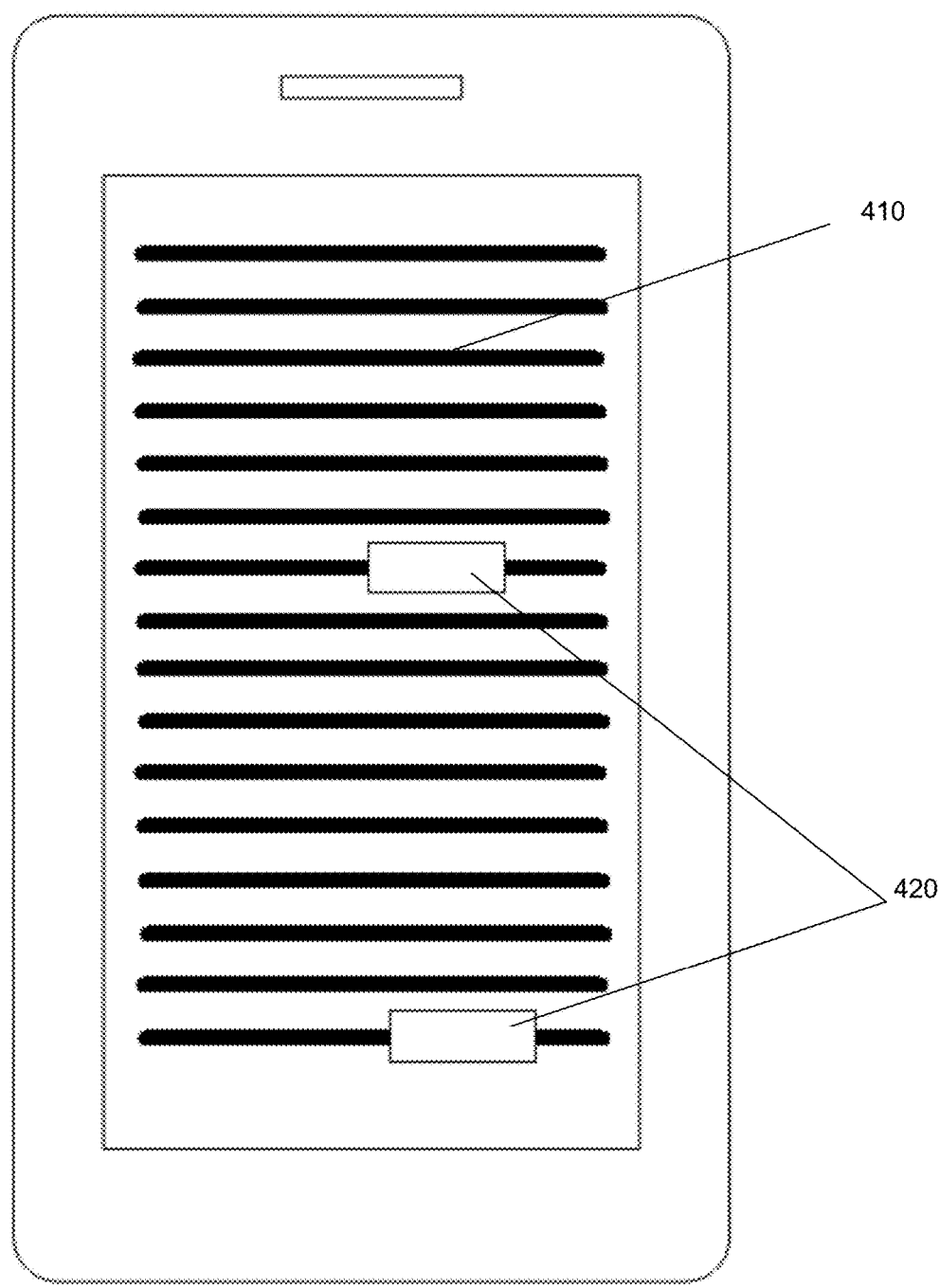
FIG. 4 is an illustrative diagrammatic view of a client electronic signature application document display interface, according to one or more embodiments of the present disclosure.

Referring now also to FIG. 4, there is shown a diagrammatic view of a client ESV/MS 76 application document display interface 400. The document display interface 400 may display a digital copy of the document 410 on a screen of the smartphone 32. The user may select fields 420 within the document 410 using a pointing device which may require their electronic signature. To administer a signature the smartphone's 32 display may be configured as an input field, wherein the user may draw their signature using their finger or a stylus as if it were a handwritten signature using pen and paper.

Figure 5:
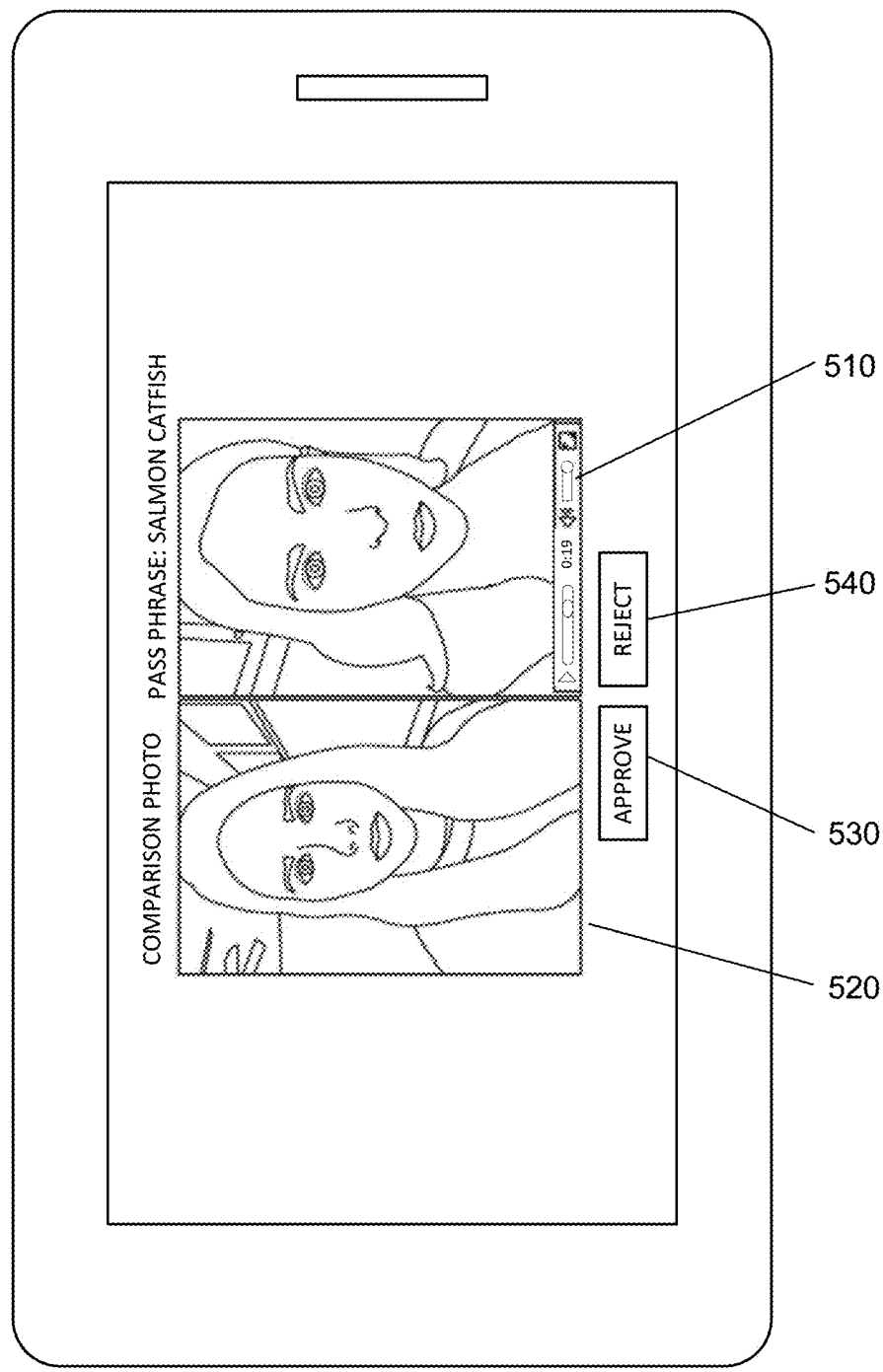
FIG. 5 is an illustrative diagrammatic view of a client electronic signature application verification interface, according to one or more embodiments of the present disclosure.

Referring now also to FIG. 5, there is shown a diagrammatic view of a client application ESV/MS 76 user verification interface 500. The user 48 may be presented with an visual and/or audio prompt as part of the ESV process 10 and/or meeting synchronization process 11, wherein the prompt may include instructions to perform one or more specific actions. The client monitoring application 76 may utilize at least some of the smartphone 32 sensor(s) to collect personally identifiable information pertaining to the user 48, wherein the personally identifiable information may enable the user 48 to be uniquely identified. For example, the smartphone 32 may include one or more camera(s), and the one or more camera(s) may be configured by the client ESV/MS application 76 to capture a real-time image 510 of the user 48. The real-time image 510 may be a still image and/or a video image of the user 48. The one or more real-time image(s) 510 may be time and/or date stamped. The still image and the video image may have different resolutions, and may be used for different purposes. For example, the still image may have a higher resolution than the video image, and may be used to uniquely identify the user 48. The video image may have a lower resolution than the still image, and may be used to confirm that an user 48 is performing a required task. For instance, the video image may be used to confirm that the user 48 is performing a required task, such as signing the document 410, and/or saying an identifiable and distinguishable phrase, such as their name. In some instances the video image may be used to uniquely identify the user 48.

Referring again to FIG. 5, there is a shown a diagrammatic view of a real-time image 510 of the user 48 compared to a reference image 520 of the user 48. The reference image 520 may be may be stored locally (e.g. via storage device 40) and/or remotely (e.g. via storage device 24) at one or more storage locations. In another embodiment, the reference image 520 may be stored locally 40, and may be used to prompt the user 48 as to the requirements of the real-time image 510 that is to be recorded. For example, the reference image 520 may be a facial portrait, and the may be used to inform the user 48 of the relative size of the real-time image 510 that is to be recorded. The reference image 520 may be at least one of, a generic profile image, a previously recorded and stored reference image 520 of the user 48, and a generic facial profile silhouette. The reference image 520 may be used to align, and resize the real-time image 510. For instance, the real-time image 510 may be superimposed upon the reference image 520, and recording of the real-time image 510 may automatically begin when the real-time image 510 and the reference image 520 are substantially aligned. Alternatively, the reference image 520 may be displayed adjacent to the real-time image 510, and used as a visual reference for a supervisor 66.

In some embodiments, the reference image 520 may enable the user 48 to be uniquely identified. For example, a supervisor 66 may compare the real-time image 510 with the reference image 520 for the purpose of uniquely identifying the user 48. The supervisor 66 may have the option to approve the real-time image 510 using an approval button 530 or reject the real-time image 510 using a rejection button 540, wherein the approval may or may not be in real-time. In some instances, the comparison may be may be done by one or more software analysis programs. The one or more software analysis programs may be part of the client ESV/MS process 16 and/or ESV process 10 and/or meeting synchronization process 11, wherein ESV process 10 and/or meeting synchronization process 11 may be a web based monitoring process.

In some embodiments, the user's 48 current location and/or location data may be determined by the client monitoring application 76, and transmitted to the monitoring application 72, as part of the document signing transaction session described herein. The location data may be obtained from an integrated Global Positioning System (GPS) sensor within the smartphone 32. The location data may further be Assisted Global Positioning System (A-GPS) data, wherein GPS data is supplemented by Wi-Fi access point identification information and/or cell phone tower identification information.

In some embodiments, the method may further include the process of knowledge based authentication and/or antecedent proofing, whereby the user must successfully answer identity challenge questions to validate their identity. Accordingly, given information about the person, the method may generate out of wallet or identity challenge questions. The customer must answer them correctly. This may be provided as an alternative to the photo ID based identity verification. If it passes, the audit trail of the transaction may be stored, just like that of the photo ID. The method may also include an identity examination where the user is required to answer identity challenge questions.

In some embodiments, each document may be "locked" or sealed with a digital security certificate. This certificate may be associated with the "observer" and may be associated with the graphical seal that they apply. The certificate locks the document so it cannot be edited, it also binds the document to the "observer" so that the observer may validate the transaction after the fact.

In some embodiments, any and all data may be stored in a logically associated way. As such, the document may be locked/encrypted and may be associated with the record of the transaction such that the document and the transaction can be independently verified via the recorded details of the transaction.

Referring now to FIGS. 6-13, embodiments depicting examples consistent with meeting synchronization process 11 are provided. Meeting synchronization process 11 may provide a purpose-built platform for performing remote electronic document notarization. Accordingly, synchronized software clients may allow notary agent users to maintain precise control over the notarization proceeding, and control a signer users' interactions with tools and documents.

Figure 6:
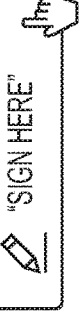
FIG. 6 is an illustrative diagrammatic view of a document preparation tool for adding required actions, according to one or more embodiments of the present disclosure.

FIG. 6 illustrates a graphical user interface 600 that may be used in accordance with meeting synchronization process 11. In this particular example a document preparer (e.g., a user of a business product) may use annotation tools to apply a required action 601 (in this example, a signature). When applied to a document that is then sent to a signer for notarization, each required action may be completed by the signer before the notary agent may complete the notary meeting.

Figure 7:
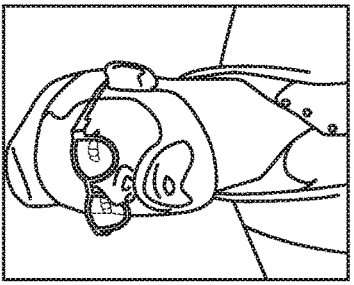
FIG. 7 is an illustrative diagrammatic view of a main web-browser-based software client GUI for notary agents, according to one or more embodiments of the present disclosure.

FIG. 7 illustrates a graphical user interface 700 that may be used in accordance with meeting synchronization process 11. This particular example depicts the notary agent's graphical user interface (GUI), which may be used to facilitate notary meetings. In operation, the notary agent may select the signing document they wish to present to the signer by accessing the document selection control 702. When a signing document is selected, the notary agent may select the signing document page they wish to display to the signer with the page selection control 703. The sum of all required actions added to documents in the meeting transaction by the preparer (referenced in FIG. 6), appears in the actions required control 704. The notary agent may switch between required actions by using the next/previous action indicators.

Figure 8:
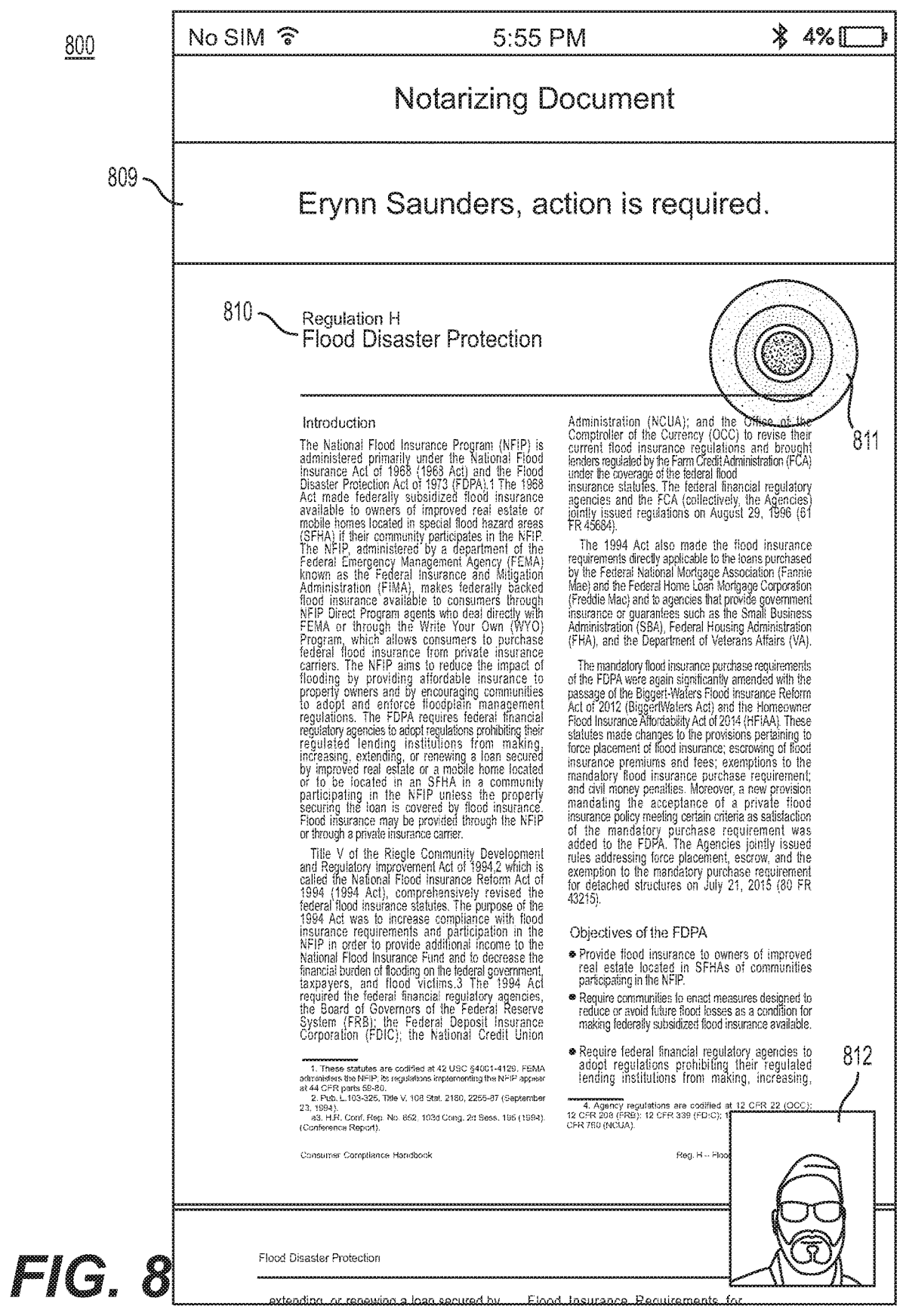

In some embodiments, the document surface 705 may allow the notary agent to scroll through the document, which initiates synchronized scrolling of the signer's document view, shown in the graphical user interface of FIG. 8. The signer may assume control of their document view at any time, if desired. This may be performed using any suitable technique, some of which may include, but are not limited to, by scrolling or zooming the document surface.

In some embodiments, if the notary meeting transaction includes more than one signer, the current signer control 706 may allow the notary agent to choose which signer has control of the document annotation tools. The signer who has control of the tools may themselves issue control of document signing tools to another signer.

In some embodiments, the notary agent has the ability to complete the meeting with the complete control 708. This control may be disabled until all required actions and notarial information have been applied to the documents in the meeting transaction. Additionally and/or alternatively, the notary agent has the option to end a meeting at any time with the terminate control 707, ending it simultaneously for all participants.

FIG. 8 illustrates an example of a graphical user interface 800, which may be used by the document signer. In operation, the document surface 810 may scroll as the notary agent scrolls, as described in FIG. 7. The signer may independently scroll and zoom the document at any time, but the notary agent has the ability to retake control of the signer's document view at any time by placing a pointer 811 for the current signer. When a pointer is placed, the current signer sees the action required bar 809. The signer may maintain visual contact with the notary agent throughout the proceeding in the notary agent video feed 812.

Figure 9:
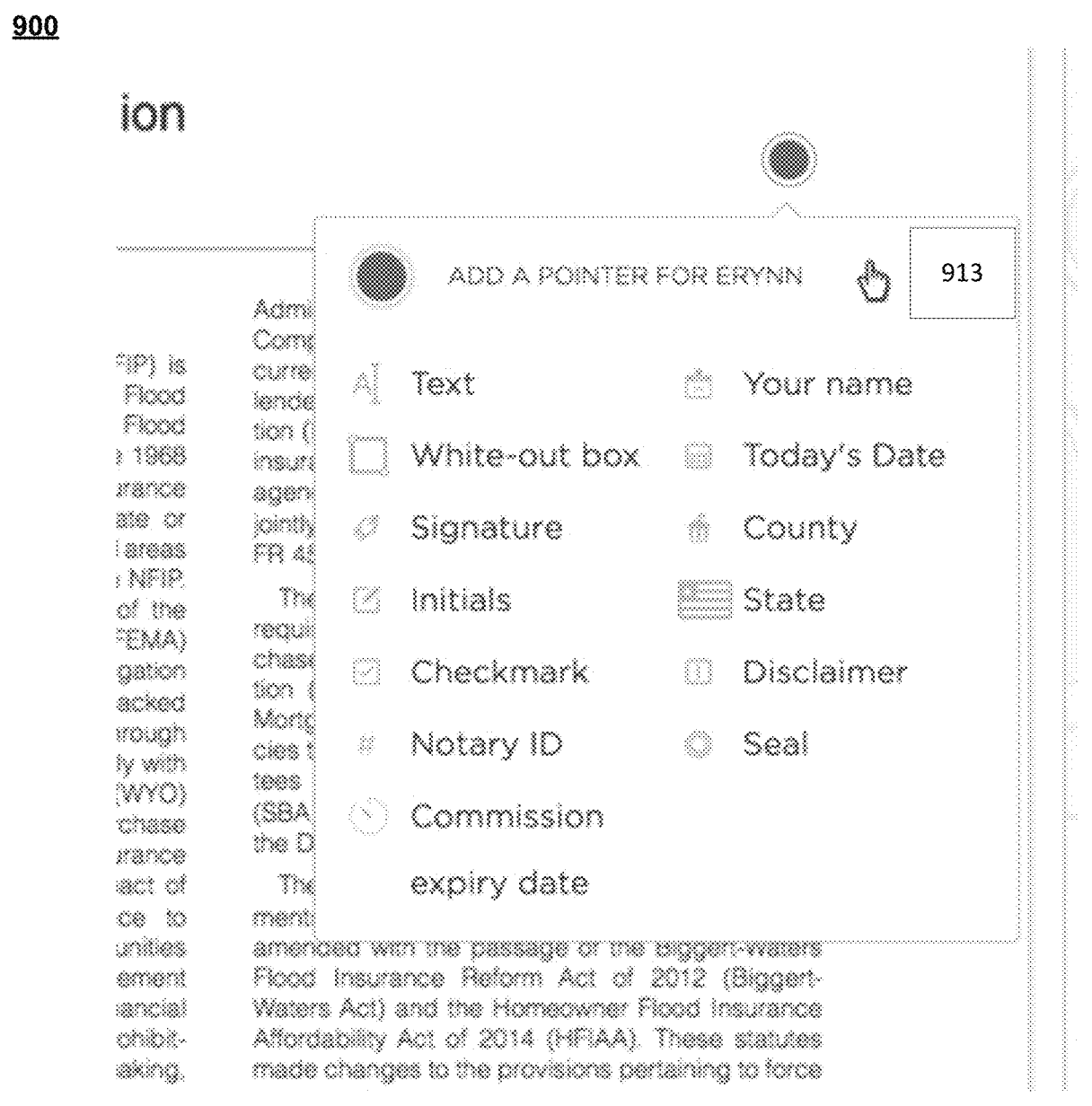

FIG. 9 illustrates an example of a graphical user interface 900 depicting the pointer control that the notary agent may use to require action of a signer, and re-synchronize the shared document view when necessary. In operation, the agent may select anywhere on the document surface, exposing the annotation tool menu. At the top of the menu, they may click the add pointer option 913. This initiates the signer control response described in FIG. 8.

FIG. 10 illustrates an example of the document selection control accessed by the notary agent via FIG. 7. This control may be displayed only in multi-document transactions. When open, the notary agent may visually determine which documents the customer may be allowed to annotate 1014, how many actions are required on each document 1015, and whether notarization is required on each document 1016. At least one document in a notary transaction must require notarization. The notary may select any document in the list to view. When the notary selects a new document, it may be immediately visible to the signer in their GUI (see FIG. 8). While the signer may independently scroll within the currently active document, they may not select a document independent of the document selected by the notary agent.

Figure 11:
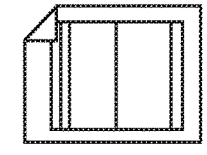
FIG. 11 is an illustrative diagrammatic view of a notary agent document page thumbnail control, according to one or more embodiments of the present disclosure.

FIG. 11 illustrates an example of the document page thumbnail control accessed by the notary agent via FIG. 7. This control may display for all transaction types. When open, the notary agent may visually determine which document pages require action 1117, if any actions were designated by the transaction originator (described in FIG. 6). Selecting any thumbnail image scrolls the current active document to the corresponding page, in both the notary agent's and signer's document view.

Additionally, the notary agent may insert a loose leaf notarial certificate page into the document 1118. When added, the certificate page may be immediately visible to the signer.

Figure 12:
FIG. 12 is an illustrative diagrammatic view of a signer annotation tools, with control for multiple signers, according to one or more embodiments of the present disclosure.

FIG. 12 illustrates an example of the signer's annotation tools menu, when more than one signer is participating in a notarization meeting. The annotation tools may include a visual display indicating which signer currently has control of the annotation tools, and may also provide the current signer the ability to transfer control to another signer 1219. The current signer can be set at any time by the notary agent, using the current signer control described in FIG. 7. The values populated on the document by each annotation tool 1220 may be based on the signer who currently has control. For example, if the current signer is named Laura Doe, then clicking "Name" in the annotation tool may place an annotation reading "Laura Doe." If she transfers control to another signer, John Doe, and he clicks "Name", the annotation may read "John Doe." In some embodiments, the synchronized software clients may include the web and mobile apps that use the synchronization framework.

Figure 13:
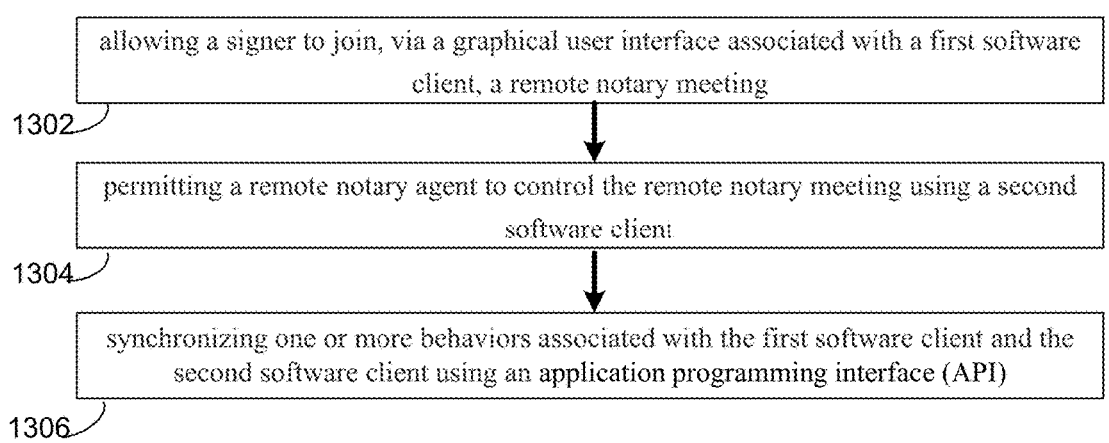
FIG. 13 is an illustrative flowchart of the meeting synchronization ("MS") process of FIG. 1, according to one or more embodiments of the present disclosure.

Referring now to FIG. 13, a flowchart depicting one or more operations consistent with meeting synchronization process 11 is provided. The method may include allowing (1302) a signer to join, via a graphical user interface associated with a first software client, a remote notary meeting. The method may also include permitting (1304) a remote notary agent to control the remote notary meeting using a second software client. The method may further include synchronizing (1306) one or more behaviors associated with the first software client and the second software client using an application programming interface (API). Numerous other operations, such as those discussed above, are also within the scope of the present disclosure.

Referring once more to FIG. 1, an ESV process and/or meeting synchronization process 11 may be coupled to a computer or computer network. For example, server ESV process 10 and/or meeting synchronization process 11 may reside on and may be executed by server computer 20, which may be connected to network 22 (e.g., the Internet or a local area network). Examples of server computer 20 may include, but are not limited to: a personal computer, a server computer, a series of server computers, a mini computer, and/or a mainframe computer. Server computer 20 may be a web server (or a series of servers) running a network operating system, examples of which may include but are not limited to: Microsoft® Windows Server®; Novell® Netware®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.)

The instruction sets and subroutines of server ESV process 10 and/or meeting synchronization process 11, which may be stored on storage device 24 coupled to server computer 20, may be executed by one or more processors (not shown) and one or more memory architectures (not shown) incorporated into server computer 20. Storage device 24 may include but is not limited to: a hard disk drive; a flash drive, a tape drive; an optical drive; a RAID array; a random access memory (RAM); a read-only memory (ROM); an erasable programmable read-only memory (EPROM); and a Flash memory.

Server computer 20 may execute a web server application, examples of which may include but are not limited to: Microsoft® IIS, Novell® Web Server™, or Apache® Tomcat®, that allows for access to server computer 20 (via network 22) using one or more protocols, examples of which may include but are not limited to HTTP (i.e., HyperText Transfer Protocol), SIP (i.e., session initiation protocol), and the Lotus® Sametime® VP protocol. (Webserver is a trademark of Novell Corporation in the United States, other countries, or both; Apache and Tomcat are registered trademarks of Apache Software Foundation in the United States, other counties, or both; Lotus and Sametime are registered trademarks of International Business Machine Corporation in the United States other countries, or both). Network 22 may he connected to one or more secondary networks (e.g., network 26), examples of which may include but are not limited to: a local area network; a wide area network; or an intranet, for example.

In addition/as an alternative to server ESV process 10 and/or meeting synchronization process 11, one or more client ESV/MS processes (e.g., client ESV/MS processes 12, 14, 16, 18) may reside on and may be executed by one or more client electronic devices (e.g., client electronic devices 28, 30, 32, and/or 34, respectively). Accordingly, in some embodiments, the ESV/MS process may be a server-side process, in which all of the functionality may be performed on server computer 20. Further, the ESV/MS process may be a client-side process, in which all of the functionally may be performed on a client electronic device. In still further embodiments, the ESV/MS process may include a hybrid server-client process, in which at least at least one of the functionality may be performed by a server device and at least at least one of the functionality may be performed by a client device.

Examples of client electronic devices may include but are not limited to personal computer 28, laptop computer 30, a smartphone 32, notebook computer 34, personal digital assistant (not shown), and an application specific device, a tablet (not shown), a server (not shown), a television (not shown), a smart television (not shown), a media (e.g., video, photo, etc.) capturing device (not shown), and a dedicated network device (not shown). Client electronic devices 28, 30, 32, 34 may each be coupled to network 22 and/or network 26 and may each execute an operating system, examples of which may include but are not limited to Android™, Apple® iOS®, Mac® OS X®; Microsoft® Windows®, Microsoft Windows CEO, Red Hat® Linux®, or a custom operating system. (Android is a registered trademark of Google Inc.; Microsoft and Windows are registered trademarks of Microsoft Corporation in the United States, other countries or both; Apple iOS, Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of client ESV/MS processes 12, 14 16, 18, which may be stored on storage devices 36, 38, 40, and 42 (respectively) coupled to client electronic devices 28, 30, 32, and 34 (respectively), may be executed by one or more processors (not shown) and one or more memory architectures (not shown) incorporated into client electronic devices 28, 30, 32, 34 (respectively). Storage devices 36, 38, 40, and 42 may include but are not limited to: a hard disk drive; a solid state drive (SSD); a flash drive, a tape drive; an optical drive; a RAID array; a random access memory (RAM); a read-only memory (ROM); an erasable programmable read-only memory (EPROM); and a Flash memory.

Users 44, 46, 48, and 50 (also variously referred to as "users," "monitors" 66, "agents" 66 or "supervisors" 66) may access an ESV/MS process in various ways. For example, at least some of these users may access server ESV process 10 and/or meeting synchronization process 11 directly through the device on which a client process (e.g., client ESV/MS processes 12, 14, 16, 18) is executed, namely client electronic devices 28, 30, 32, 34. Users 44, 46, 48, 50 may access server ESV process 10 and/or meeting synchronization process 11 directly through network 22 and/or through secondary network 26. Further, server computer 20 (i.e., the computer that executes server ESV process 10 and/or meeting synchronization process 11) may be connected to network 22 through secondary network 26, as illustrated with phantom link line 52. Users 44, 46, 48, 50 may also access an ESV/MS application in similar ways. ESV process 10 and/or meeting synchronization process 11 may include one or more user interfaces, such as browsers and textual or graphical user interfaces, through which users 44, 46, 48, 50 may access ESV process 10 and/or meeting synchronization process 11.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing wireless communication channel 54 between laptop computer 30 and WAP 56. Smartphone 32 is shown wirelessly coupled to network 22 via wireless communication channel 58 established between smartphone 32 and cellular network/bridge 60, which is shown directly coupled to network 2.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ is a telecommunications industry specification that allows, e.g., mobile phones, computers, smartphones, and other electronic devices to be interconnected using a short-range wireless connection. The short-range wireless connection may include one or more proprietary wireless interfaces and/or protocols. Other forms of interconnection (e.g., Near Field Communication (NFC)) may also be used.

For the enclosed discussion, client ESV/MS process 16 has been described for illustrative purposes. It will be understood that client ESV/MS process 16 may, for example, interact and/or communicate with server ESV process 10 and/or meeting synchronization process 11 and/or may be executed within and/or one or more applications that allow for communication with other server and/or client ESV/MS processes. This is not intended to be a limitation of this disclosure, as other configurations are possible (e.g., smartphone ESV/MS process 16 may include stand-alone client processes and/or stand-alone server processes.) For example, some embodiments may include one or more of client ESV processes 12, 14, 18 or server ESV process 10 and/or meeting synchronization process 11 in place of or in addition to client ESV/MS application 76.

Computer 20 may include a data store, such as a database (e.g., relational database, object-oriented database, triple-store database, etc.) and may be located within any suitable memory location, such as storage device 24 coupled to computer 20. Any data described throughout the present disclosure may be stored in the data store. In some embodiments, computer 20 may utilize a database management system such as, but not limited to, "My Structured Query Language" (MySQL®) in order to provide multi-user access to one or more databases, such as the above noted relational database. The data store may also be a custom database, such as, for example, a flat file database or an XML database. Any other form(s) of a data storage structure and/or organization may also be used. ESV process 10 and/or meeting synchronization process 11 may be a component of the data store, a stand-alone application that interfaces with the above noted data store and/or an applet/application that is accessed via client applications 22, 24, 26, and 28. The above noted data store may be, in whole or in part, distributed in a cloud computing topology. In this way, computer 20 and storage device 24 may refer to multiple devices, which may also be distributed throughout the network.

Computer 20 may execute a ESV application (e.g., ESV/MS application 72). ESV process 10 and/or meeting synchronization process 11 and/or ESV/MS application 72 may be accessed via client applications 70, 74, 76, and 78. ESV process 10 and/or meeting synchronization process 11 may be a standalone application, or may be an applet/application/script/extension that may interact with and/or be executed within ESV/MS application 72, a component of ESV application 72, and/or one or more of client applications 70, 74, 76, and 78. ESV application 72 may be a standalone application, or may be an applet/application/script/extension that may interact with and/or be executed within ESV process 10 and/or meeting synchronization process 11, a component of ESV process 10 and/or meeting synchronization process 11, and/or one or more of client applications 70, 74, 76, and 78. One or more of client applications 70, 74, 76, and 78 may be a standalone application, or may be an applet/application/script/extension that may interact with and/or be executed within and/or be a component of ESV process 10 and/or meeting synchronization process 11 and/or ESV application 72. The instruction sets and subroutines of client applications 70, 74, 76, and 78, which may be stored on storage devices 36, 38, 40, 42, coupled to client electronic devices 28, 30, 32, and 34 may be executed by one or more processors (not shown) and one or more memory architectures (not shown) incorporated into client electronic devices 28, 20, 32, and 34.

One or more of client applications 70, 74, 76, and 78 may be configured to effectuate some or all of the functionality of ESV/MS application 20 (and vice versa). Accordingly, ESV/MS application 72 may be a purely server-side application, a purely client-side application, or a hybrid server-side/client-side application that is cooperatively executed by one or more of client applications 70, 74, 76, and 78 and/or ESV/MS application 20. As one or more of client applications 70, 74, 76, and 78, ESV process 10 and/or meeting synchronization process 11, and ESV application 20, taken singly or in any combination, may effectuate some or all of the same functionality, any description of effectuating such functionality via one or more of client applications 70, 74, 76, and 78, ESV process 10 and/or meeting synchronization process 11, ESV application 72, or combination thereof, and any described interaction(s) between one or more of client applications 70, 74, 76, and 78, ESV process 10, ESV application 72, or combination thereof to effectuate such functionality, should be taken as an example only and not to limit the scope of the disclosure.

While certain embodiments disclosed herein may be based upon a United States notary process and may involve and/or incorporate the laws and regulations according thereto it should be noted that the teachings of the present disclosure may be extended to other jurisdictions as well. Accordingly, embodiments of ESV process 10 and/or meeting synchronization process 11 may be used in any suitable country and/or geographical area.

As will be appreciated by one skilled in the art, aspects of the present disclosure may be implemented as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product implemented in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical drive, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transient computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible embodiments of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative embodiments, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiment(s) thereof, it will be apparent that modifications, variations, and any combinations of embodiment(s) (including any modifications, variations, and combinations thereof) are possible without departing from the scope of the disclosure defined in the appended claims.

What is claimed is:

1. A computer-implemented method for synchronizing notary meeting interactions between multiple software clients comprising:

allowing a signer to join, via a graphical user interface associated with a first software client, a remote notary meeting;

permitting a remote notary agent to control the remote notary meeting using a second software client, wherein permitting the remote notary agent to control the remote notary meeting includes controlling a presentation of signing documents to the signer and wherein a signer's display of a document is synchronized with the remote notary agent's display of the document, wherein permitting a remote notary agent to control the remote notary meeting includes providing the remote notary agent with an option to assume control of a display of the document and in response to receiving an indication that the remote notary agent has selected a thumbnail image, causing the signer's display of the document to scroll to a location on the graphical user interface associated with the first software client that corresponds with the location in the document selected by the remote notary agent for the thumbnail image;

synchronizing one or more behaviors associated with the first software client and the second software client using an application programming interface (API);

causing to display a first annotation tools menu at the graphical user interface associated with the first software client, wherein the first annotation tools menu is configured to enable an annotation of the document in a signer selectable location; and causing to display a second annotation tools menu at a graphical user interface associated with the second software client, wherein the first annotation tools menu and the second annotation tools menu are different, wherein the second annotation tools menu is configured to enable an annotation of the document in a remote notary agent selectable location.

2. The computer-implemented method for synchronizing notary meeting interactions between multiple software clients of claim 1 further comprising:

preventing the notary agent from completing the remote notary meeting until all signers have complete all required actions, wherein at least one of the required actions includes capturing an image of the signer, wherein the image of the signer includes a video image and a still image with a higher resolution than the video image; and allowing the notary agent, via the second software client graphical user interface, to complete the remote notary meeting once all required actions have been completed.

3. The computer-implemented method for synchronizing notary meeting interactions between multiple software clients of claim 2 further comprising:

resizing and aligning the image of the signer based on at least a reference image, wherein the reference image is extracted from an identification document of the at least one signer.

4. The computer-implemented method for synchronizing notary meeting interactions between multiple software clients of claim 1 further comprising:

allowing the remote notary agent to terminate the remote notary meeting for all parties.

5. The computer-implemented method for synchronizing notary meeting interactions between multiple software clients of claim 1 further comprising:

causing to display, at the graphical user interface associated with the second software client, a display indicating a number of actions required in order to complete the remote notary meeting.

6. The computer-implemented method for synchronizing notary meeting interactions between multiple software clients of claim 1 further comprising:

causing to display, at the graphical user interface associated with the second software client, a display indicating one or more representations of each document page requiring action of the signer, indicating a number of actions required.

7. The computer-implemented method for synchronizing notary meeting interactions between multiple software clients of claim 1 further comprising:

allowing the notary agent, via the second software client graphical user interface, to generate a notarial certificate upon a current signing document; and causing the notarial certificate to be displayed to the signer at the first software client.

8. The computer-implemented method for synchronizing notary meeting interactions between multiple software clients of claim 1 further comprising:

allowing the notary agent to issue control of one or more document signing tools to a specific signer of a plurality of signers, wherein the notary agent is distinct from the plurality of signers;

allowing each specific signer of the plurality of signers to transfer control of the one or more document signing tools to another specific signer; and populating the document with the first annotations tool menu based on the specific signer with control of the one or more documents signing tools.

9. The computer-implemented method for synchronizing notary meeting interactions between multiple software clients of claim 1 wherein the first annotation tools menu is configured to display a first plurality of annotation options, wherein the second annotation tools menu is configured to display a second plurality of annotation options.

10. The computer-implemented method for synchronizing notary meeting interactions between multiple software clients of claim 1, wherein the synchronizing one or more behaviors includes determining a confidence score.

11. The computer-implemented method for synchronizing notary meeting interactions between multiple software clients of claim 1, wherein permitting a remote notary agent to control the remote notary meeting includes providing the remote notary agent with an option to suspend a signer's ability to independently scroll or zoom associated with a signer's document view.

12. A non-transitory computer readable medium having stored thereon instructions, which when executed by a processor result in one or more operations, the operations comprising:

allowing a signer to join, via a graphical user interface associated with a first software client, a remote notary meeting;

permitting a remote notary agent to control the remote notary meeting using a second software client, wherein permitting the remote notary agent to control the remote notary meeting includes controlling a presentation of signing documents to the signer and wherein a signer's display of a document is synchronized with the remote notary agent's display of the document, wherein permitting a remote notary agent to control the remote notary meeting includes providing the remote notary agent with an option to assume control of a display of the document and in response to receiving an indication that the remote notary agent has selected a thumbnail image, causing the signer's display of the document to scroll to a location on the graphical user interface associated with the first software client that corresponds with the location in the document selected by the remote notary agent for the thumbnail image;

synchronizing one or more behaviors associated with the first software client and the second software client using an application programming interface (API);

causing to display a first annotation tools menu at the graphical user interface associated with the first software client, wherein the first annotation tools menu is configured to enable an annotation of the document in a signer selectable location; and causing to display a second annotation tools menu at a graphical user interface associated with the second software client, wherein the first annotation tools menu and the second annotation tools menu are different, wherein the second annotation tools menu is configured to enable an annotation of the document in a remote notary agent selectable location.

13. The non-transitory computer readable medium of claim 12 further comprising:

preventing the notary agent from completing the remote notary meeting until all signers have complete all required actions, wherein at least one of the require actions includes capturing an image of the signer, wherein the image of the signer includes a video image and a still image with a higher resolution than the video image; and allowing the notary agent, via the second software client graphical user interface, to complete the remote notary meeting once all signer actions have been completed.

14. The non-transitory computer readable medium of claim 13 further comprising:

resizing and aligning the image of the signer based on at least a reference image, wherein the reference image is extracted from an identification document of the at least one signer.

15. The non-transitory computer readable medium of claim 12 further comprising:

allowing the remote notary agent to terminate the remote notary meeting for all parties.

16. The non-transitory computer readable medium of claim 12 further comprising:

causing to display, at the graphical user interface associated with the second software client, a display indicating a number of actions required in order to complete the remote notary meeting.

17. The non-transitory computer readable medium of claim 12 wherein the first annotation tools menu is configured to display a first plurality of annotation options, wherein the second annotation tools menu is configured to display a second plurality of annotation options.

* * * * *